United States Patent [19]

Neuhaus

[11] Patent Number: 5,037,062

[45] Date of Patent: Aug. 6, 1991

[54] QUICK ACTING BALL VALVE

[75] Inventor: Dietmar Neuhaus, Duesseldorf, Fed. Rep. of Germany

[73] Assignee: Deutsche Forschungsanstalt fur Luft- und Raumfahrt e.V, Cologne, Fed. Rep. of Germany

[21] Appl. No.: 424,410

[22] Filed: Oct. 20, 1989

[30] Foreign Application Priority Data

Oct. 20, 1988 [DE] Fed. Rep. of Germany ....... 3835788

[51] Int. Cl.⁵ ............................................. F16K 31/44
[52] U.S. Cl. ...................................... 251/76; 251/82; 137/901
[58] Field of Search .................. 137/901, 522; 251/76, 251/82

[56] References Cited

U.S. PATENT DOCUMENTS

| | | | |
|---|---|---|---|
| 3,534,620 | 10/1970 | Nielsen | 251/337 |
| 4,057,216 | 11/1977 | Flaschar et al. | 137/901 |
| 4,273,310 | 6/1981 | Ginzler | 137/901 |
| 4,420,141 | 12/1983 | Goloff | 251/337 |
| 4,558,587 | 12/1988 | Fruzzetti | 137/901 |
| 4,595,046 | 6/1986 | Iino | 137/901 |
| 4,667,349 | 5/1987 | Son | 137/901 |

FOREIGN PATENT DOCUMENTS 2843152 3/1980 Fed. Rep. of Germany .

Primary Examiner—A. Michael Chambers
Attorney, Agent, or Firm—Spensley Horn Jubas & Lubitz

[57] ABSTRACT

A separating wall having a valve opening is disposed between a chamber holding a high pressure and a chamber holding a low pressure. The valve seat is closed by a ball acting as a valve body. For a quick opening of the valve, an actuating member imparts a lateral impact to the ball, thereby lifting the ball off the valve seat. Setting the ball back onto the valve seat is effected under the influence of the gas flow passing through the valve opening. The valve has extremely short switching times and allows for a high repetition frequency.

5 Claims, 1 Drawing Sheet

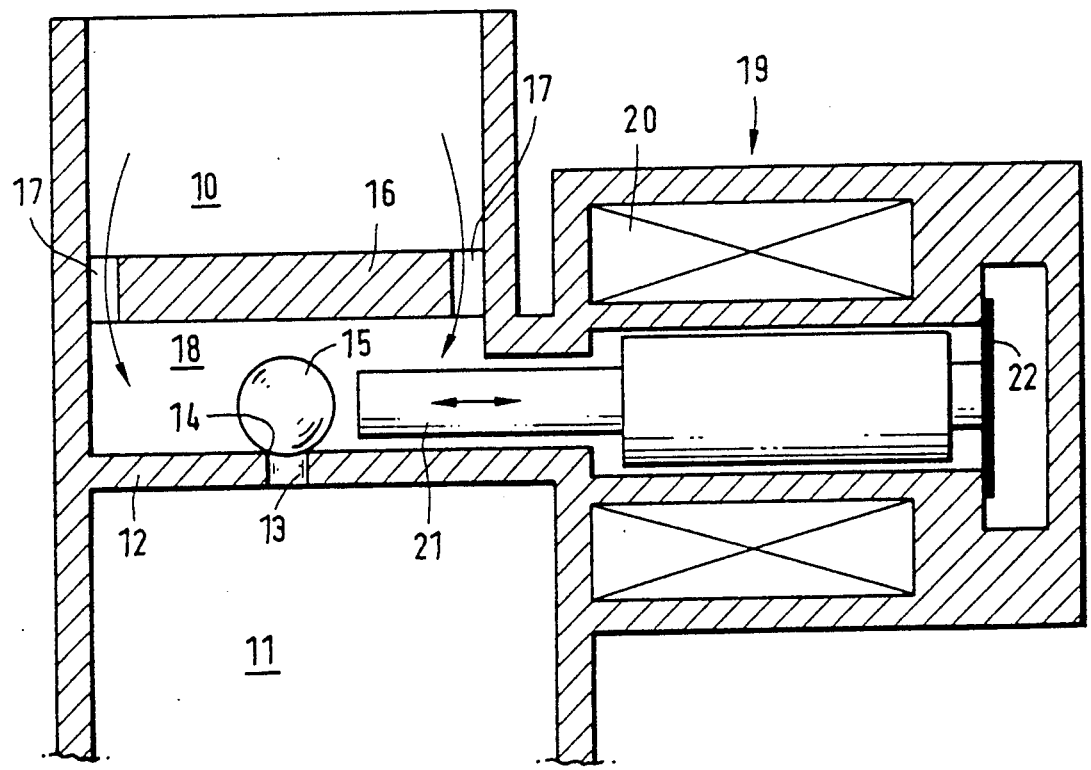

QUICK ACTING BALL VALVE

BACKGROUND OF THE INVENTION

1. Field of the Invention

The invention relates to a quick acting ball valve.

2. Description of the Related Art

For specific applications, quick acting ball valves are needed which are able to allow a sudden passage of a fluid flow and which have a high switching rate. One such application is the time-of-flight spectroscopy in a molecular-ray-apparatus. In time-of-flight spectroscopy, a gas ray is released for a short time and the time the gas atoms take to travel a predetermined path is determined. The interval-like gas flow, interrupted by the quick acting valve, reduces the surplus gas and the necessary power of the pump. Presently, a gas ray is continuously introduced into the apparatus and released intermittently for the path by an interrupting valve.

Valves are known in which a spring-biased bolt is pressed against a valve seat. In order to open the valve, the bolt can be lifted from the valve seat by means of a solenoid. Such valves have the disadvantage of a low repetition frequency. The masses of both the bolt and the valve body have to be commonly accelerated, which causes a retardation.

It is the object of the present invention to provide a quick-action ball valve which can release a fluid flow in an impulse-like manner, which can be operated at a high repetition frequency and which has a high service life because of low wear.

SUMMARY OF THE INVENTION

In the ball valve of the present invention, the ball closes the opening, due to the pressure difference between the two chambers. In order to unblock the opening, a short lateral impact is imparted to the ball by the actuator, so that it clears the opening. The movement of the ball back onto the valve seat is effected by the fluid flow passing through the opening, only. The short switching times and the high repetition frequency result from the fact that only the mass of the ball has to be accelerated and that the actuator has no direct coupling to the ball. The actuating member of the actuator is accelerated before it hits the ball, so that only a short impact is exerted on the ball. The ball is not influenced by any mechanical parts, but it is freely movable and, in particular, it is not spring-biased. The ball not being in friction contact with other components, there is practically no friction wear. In order not to damage the ball and the actuator by the impacts, the impact surfaces are suitably made of hard metal.

It is a particular advantage of the ball valve that its function is independent from its orientation, since the function does not use the influence of gravity. Setting back the ball is effected by the fluid flow, the influence of gravity being negligeable if the pressure difference is sufficiently large.

The ball valve of the present invention is particularly suited for application in a molecular ray apparatus for time-of-flight spectroscopy. In this application, the valve is used for releasing and interrupting a gas flow. Further applications are the switching of fluids, e.g., in fuel injection systems of internal combustion engines. The valve is also suited for implementation at low temperatures for switching cryogenic fluids. Since the function of the valve is independent from temperature, it is also suited for applications involving high temperatures.

DESCRIPTION OF THE PREFERRED EMBODIMENT

The following is a detailed description of an embodiment of the invention with reference to the accompanying drawing.

The drawing schematically shows a longitudinal section of the ball valve. The valve is located between two chambers 10,11 having different gas pressures. The chambers 10, 11 are separated by the separating wall 12. The separating wall 12 has an opening 13, the edge of which forms the valve seat 14. The gas pressure in the chamber 10 to which the valve seat 14 faces, is considerably higher than in chamber 11.

The ball 15 is located in chamber 10, which ball sits on valve seat 14 in the closed state, thus closing opening 13 gastightly. A chamber 18 separated from chamber 10 by a separating wall 16 and having openings 17, serves to limit the movement of ball 15. Instead of separating wall 16, a cage may be provided that is arranged around opening 13, having the effect of limiting the range of movement of ball 15.

The actuator 19 has a stationary solenoid 20 and a movable actuating member 21. Upon excitation of solenoid 20, the bolt-like actuating member 21 is moved laterally towards ball 15, in order to roll ball 15 off valve seat 14. A reset spring 22 acts upon actuating member 21, which pulls back the actuating member upon de-energization of solenoid 20. The impact of actuating member 21 is exerted parallel to separating wall 12, whereby ball 15 is hit exactly at its equator (parallel to separating wall 12).

Once ball 15 has been lifted off seat 14, it is caught by the gas flow passing through opening 13, and driven back to the valve seat independent from the respective orientation of the valve.

Preferably, a high-strength and non-abrasive material, in particular saphire or hard metal, is used for ball 15 and valve seat 14. Actuating member 21 or at least its front impact portion should preferably also consist of such material.

The opening and closing time of the valve is influenced by the pressure difference between chambers 10 and 11, the mass of ball 15 and the diameter of bore 13. A ball of low mass and a strong gas flow at an open valve allow short opening and closing times.

In the drawing, the actuating member 21 is illustrated in its rest position, i.e. with solenoid 20 de-energized. In this position, actuating member 21 is laterally spaced from ball 15. Upon excitation of solenoid 20, actuating member 21 hits the resting ball 15 at a basic speed $v_o$ which is reached after termination of the acceleration phase of the actuating member. Since the mass of actuating member 21 is substantially larger than that of ball 15, ball 15 is abruptly removed from valve seat 14 by the impact. This results in the desired quick opening behavior of the valve.

I claim:

1. A quick acting ball valve comprising:
   a separating wall separating two chambers holding different pressures,
   a valve opening provided in said separating wall, the edge of said opening forming a valve seat,
   a ball serving as a valve body for closing said valve opening, and a actuator having an actuating member adapted to be driven towards said ball transversely to said valve seat, characterized in that said actuating member is arranged such that it imparts a substantially friction-free rolling movement to said ball, that said actuating member is spaced from said ball in its pull-back position and, upon excitation of a solenoid, hits said resting ball at a basic velocity after the end of an acceleration phase, and that moving said ball back is effected only by the fluid flow passing through said valve opening.

2. The ball valve according to claim 1, characterized in that said actuating member is biased in the pull-back direction by a spring.

3. A quick acting ball valve, comprising:
a wall having a first side, a second side and an opening,
a freestanding ball configured to seal the opening,
positioning means for moving the freestanding ball toward the opening, the positioning means comprising:
a first chamber adjacent the first side of the wall for containing a fluid at a first pressure,
a second chamber adjacent the second side of the wall for containing a fluid at a second pressure, the first pressure being greater than the second pressure to thereby establish a flow of fluid from the first chamber to the second chamber through the opening, the freestanding ball being moved toward the opening of the flow of fluid from the first chamber to the second chamber, and
impact means for imparting a lateral impact to the freestanding ball to thereby move the freestanding ball away from the opening, the impact means comprising:
an actuating member adapted to be driven towards the freestanding ball substantially transversely to the opening,
means for accelerating the actuating member towards the freestanding ball at a predetermined velocity in an acceleration phase, and
means for spacing the actuating member relative to the freestanding ball so that the actuating member impacts the freestanding ball at the predetermined velocity substantially near the end of the acceleration phase,
whereby the freestanding ball is moved back toward the opening by the flow of fluid from the first chamber to the second chamber.

4. A valve as in claim 3 further comprising spring means for biasing the actuating member away from the freestanding ball.

5. In a molecular ray apparatus having a gas flow, a device for interrupting the gas flow in the molecular ray apparatus, the device comprising:
a quick acting ball valve, comprising:
a separating wall separating two chambers holding different pressures,
a valve opening provided in said separating wall, the edge of said opening forming a valve seat;
a ball serving as a valve body for closing said valve opening, and
a actuator having an actuating member adapted to be driven towards said ball transversely to said valve seat, characterized in that said actuating member is arranged such that it imparts a substantially friction-free rolling movement to said ball, that said actuating member is spaced from said ball in its pull-back position and, upon excitation of a solenoid, hits said resting ball at a basic velocity after the end of an acceleration phase, and that moving said ball back is effected only by the fluid flow passing through said valve opening.

* * * * *